(12) United States Patent
Andreassen et al.

(10) Patent No.: US 10,382,670 B2
(45) Date of Patent: *Aug. 13, 2019

(54) COGNITIVE RECORDING AND SHARING

(71) Applicant: International Business Machines Corporation, Armonk, NY (US)

(72) Inventors: Elisabeth Andreassen, Oslo (NO); Avery W. Hagleitner, San Jose, CA (US); Pritish R. Parida, Stamford, CT (US); Andrew R. Ranck, Sunnyvale, CA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/856,439

(22) Filed: Dec. 28, 2017

(65) Prior Publication Data

US 2018/0124308 A1     May 3, 2018

Related U.S. Application Data

(63) Continuation of application No. 14/788,226, filed on Jun. 30, 2015, now Pat. No. 9,894,266.

(51) Int. Cl.
   *H04N 5/232*     (2006.01)
   *G11B 27/36*     (2006.01)
   (Continued)

(52) U.S. Cl.
   CPC ....... *H04N 5/23219* (2013.01); *G06F 16/783* (2019.01); *G06K 9/00335* (2013.01);
   (Continued)

(58) Field of Classification Search
   USPC .................................................. 386/239–248
   See application file for complete search history.

(56) References Cited

U.S. PATENT DOCUMENTS

| 6,920,283 B2 | 7/2005 | Goldstein |
| 7,633,527 B2 | 12/2009 | Pilu |
| | (Continued) | |

FOREIGN PATENT DOCUMENTS

| CA | 2846919 A1 | 9/2014 |
| WO | 2015/102722 A1 | 7/2014 |

OTHER PUBLICATIONS

Robarts, "Kipstr will Start Recording the TV Show You're Watching When You Fall Asleep," Gizmag, Dec. 18, 2014, www.gizmag.com, 2 pages.

(Continued)

*Primary Examiner* — Hung Q Dang
(74) *Attorney, Agent, or Firm* — Scully, Scott, Murphy & Presser, P.C.; Rahan Uddin, Esq.

(57) ABSTRACT

A system and method and computer program product for cognitive recording and sharing of live events. The system includes: a sensing and transmitting device that can sense the biometric signatures of an individual; a processing unit that analyses the sensed signal and initiate a set of actions; a recording device or the like to record the event; and a networked sharing device configured to subsequently share recorded event content. The system further identifies individuals' pre-cognitive inputs and additional external and internal factor input signals that are precursors to cognitive affirmation of an emotional response. These inputs will be identified, correlated, and used in training the system for subsequent identification and correlation between input factors and resulting emotional state. External factors may include: recognized emotional states, biometric inputs, and/or precognition inputs of other individuals in proximity to the subject individual. Other factors may include an individual's context.

20 Claims, 8 Drawing Sheets

(51) Int. Cl.
*G06K 9/00* (2006.01)
*G06F 16/783* (2019.01)
*G06K 9/72* (2006.01)
*H04N 5/765* (2006.01)

(52) U.S. Cl.
CPC ..... *G06K 9/00677* (2013.01); *G06K 9/00718* (2013.01); *G06K 9/00885* (2013.01); *G06K 9/72* (2013.01); *G11B 27/36* (2013.01); *H04N 5/23222* (2013.01); *H04N 5/765* (2013.01); *G06K 2009/00738* (2013.01)

(56) References Cited

U.S. PATENT DOCUMENTS

| | | |
|---|---|---|
| 8,161,069 B1 | 4/2012 | Wilder et al. |
| 2012/0222057 A1 | 8/2012 | Sadowsky et al. |
| 2012/0330659 A1 | 12/2012 | Nakadai |
| 2013/0205311 A1 | 8/2013 | Ramaswamy et al. |
| 2014/0118225 A1 | 5/2014 | Jerauld |
| 2014/0233916 A1 | 8/2014 | Bade et al. |
| 2014/0280529 A1 | 9/2014 | Davis et al. |
| 2014/0366049 A1 | 12/2014 | Lehtiniemi et al. |
| 2015/0150031 A1 | 5/2015 | Gibbon et al. |
| 2015/0178553 A1 | 6/2015 | Yoo et al. |
| 2015/0178915 A1 | 6/2015 | Chatterjee et al. |
| 2016/0057565 A1 | 2/2016 | Gold |
| 2016/0110647 A1 | 4/2016 | Kreuger et al. |
| 2016/0128617 A1 | 5/2016 | Morris et al. |
| 2016/0171514 A1 | 6/2016 | Frank et al. |
| 2016/0283816 A1 | 9/2016 | Paradkar et al. |
| 2017/0064363 A1 | 3/2017 | Wexler et al. |

OTHER PUBLICATIONS

Isaacson, "This Device Will Read Your Mind and Let You GIF Your Entire Life", The Huffington Post, Dec. 11, 2013, www.huffingtonpost.com, 3 pages.

List of IBM Patents or Patent Applications Treated as Related, dated Dec. 28, 2017, 2 pages.

COGNITIVE RECORDING AND SHARING

CROSS REFERENCE TO RELATED APPLICATION

This application is a continuation of U.S. patent application Ser. No. 14/788,226, filed Jun. 30, 2015, the contents of which are incorporated by reference herein in their entirety.

FIELD

This disclosure relates generally to recording of events using traditional recording devices such as cameras, camcorders, phones, etc. and wearable devices such as Google glass, etc., and more particularly, to a system and method that enables the recording device to adapt to an individual user's biometric signatures and use those signatures to trigger the recording of events, tagging of key observations and sharing of the events/tags with other users.

BACKGROUND

Traditional recording devices such as cameras, camcorders, phones, etc. and wearable devices such as Google glass, etc. require the user to actively know when to record. In doing so, the user recording the event is not able to enjoy the moment he/she is recording. Because users are actively interacting with technology they are not "present in the moment".

SUMMARY

A system, method and computer program product to provide recording device technology to adapt to an individual user's biometric signatures and use those signatures to trigger the recording of events, tagging of key observations and sharing of the events/tags with a user selected group. The system and method particularly will enable the user to live in the moment.

In one aspect, a system and apparatus for cognitive recording and sharing of live events is provided. The apparatus for cognitive recording and sharing of live events comprises: a processing unit; a recording device to record a live event; one or more sensors, each configured for obtaining a biometric signal data from an individual; a transmitting device for communicating the one or more biometric signals for receipt at the processing unit, the processing unit configured to: obtain a biometric signature of the individual based on a received biometric signal data; obtain a signal representing one or more of: a recognized emotional state of, a biometric signature of, and a determined precognition input of one or more other individuals in proximity to the individual; determine an individual's emotional state based on the signature in combination with the obtained signals of the one or more other individuals; and record the live event by the recording device in response to the determined emotional state.

In a further aspect, there is provided a method for cognitive recording and sharing of live events. The method comprises: receiving, at a processing device, a biometric signal from an individual; obtaining a biometric signature of the individual based on a received biometric signal data; obtaining, at the processing device, a signal representing one or more of: a recognized emotional state of, a biometric signature of, and a determined precognition input of one or more other individuals in proximity to the individual; determining, at the processing device, an individual's emotional state based on the signature in combination with the obtained signals of the one or more other individuals; and triggering a recording device to record a live event responsive to determined emotional state.

In a further aspect, there is provided a computer program product for performing operations. The computer program product includes a storage medium readable by a processing circuit and storing instructions run by the processing circuit for running a method. The method is the same as listed above.

BRIEF DESCRIPTION OF THE DRAWINGS

These and other objects, features and advantages of the present invention will become apparent from the following detailed description of illustrative embodiments thereof, which is to be read in connection with the accompanying drawings, in which.

DETAILED DESCRIPTION

Figure 1:
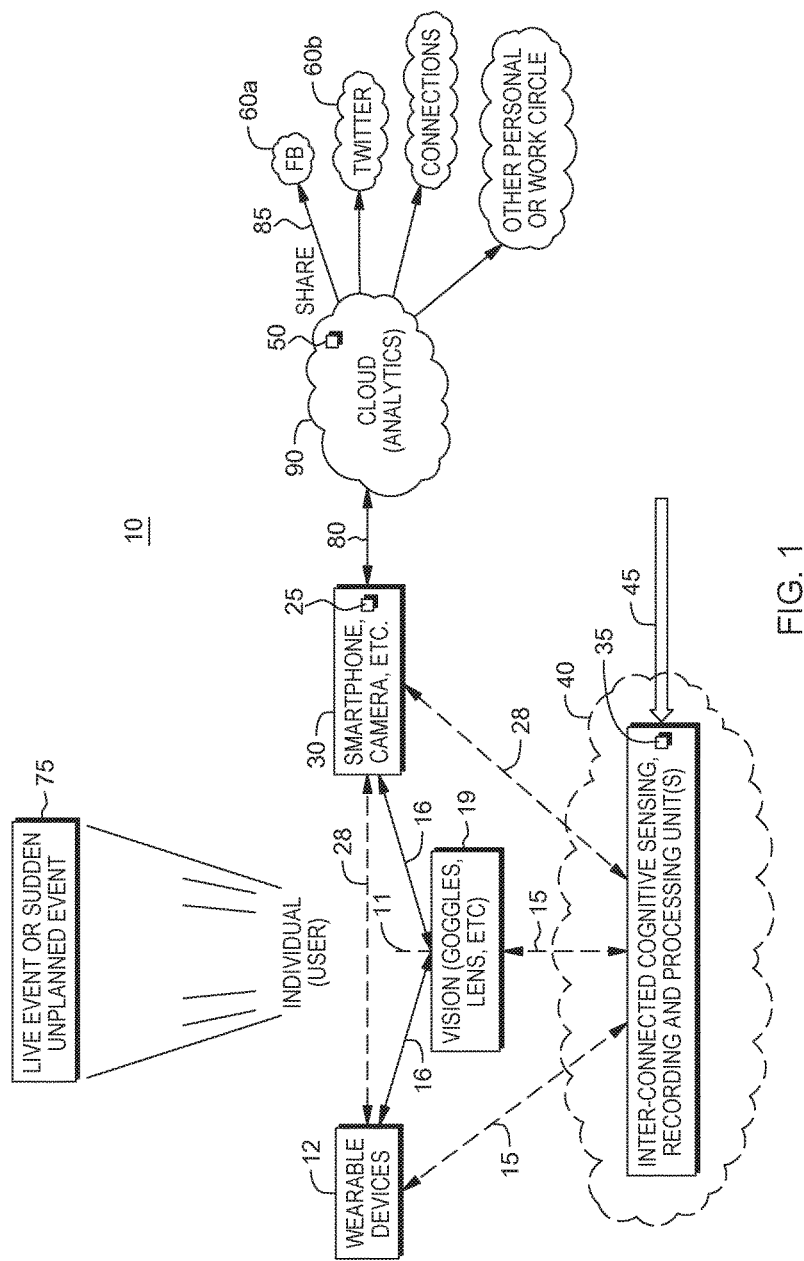
FIG. 1 shows conceptually a system 10 for cognitive recording and sharing of live events in one embodiment.

As shown in FIG. 1, there is provided a system 10 employing methods for providing an ability to adapt to an individual user's biometric signatures, use those signatures to trigger the recording of an event(s) 75, tag key observations and share the events/tags with a individuals and/or a user selected group. This will enable the individual 11 to "live in the moment" as the individual will no longer have to take the time to manually record an event.

In FIG. 1, the system 10 implements elements such as one or more wearable devices 12 that are worn by individual 11 and that includes sensor devices adapted for receiving and sensing biometric signals of that individual. The wearable devices are coupled with a transmitting device that can sense the biometric signatures of the individual and communicate the received biometric signal data as signals 15 or 16 for receipt at a receiver and ultimately a processor or like control device 25, e.g., in response to a processor query. In one embodiment, shown in FIG. 1, optionally a wearable device may include a vision device 19, e.g., a goggles or lenses (e.g., Google® glass) to generate vision signals 15 or 16 for receipt at a processor device. Further included is a processing device (e.g., a microprocessor, FPGA or like control logic device) 25 that analyses the sensed signal(s)

and responsively automatically initiates a set of actions; and a recording device 30, such as a camera or video recorder provided in a mobile smartphone device or the like, configured to automatically record a live occurring event responsive to actions or signals initiated from the processing device 25. In one embodiment, the processing device 25 is shown at the recording device 30 to control the intra-connected or inter-connected cognitive sensing employed by system 10, and including: recording and processing functions described herein. Herein, "cognitive sensing" refers to the use of the received biometric and other input signals to ascertain a cognitive and/or emotional state of the individual or other individuals in proximity to the first individual. Once a cognitive or emotional state of the individual is ascertained, system 10 generates signals to trigger a recording of the live or unplanned event by the recording device.

In one embodiment, as shown in FIG. 1, the sensing and transmitting device could be a wearable device having the aforementioned sensors/detectors, an audio/video recorder, a motion sensor, an infra-red camera, or the like. For example, a wearable device 12 could sense the biometric signals from the user and/or physical gestures and/or reactions made by the user for transmission and/or processing.

In one embodiment, sensor devices that may be worn by the user, e.g., as part of a wearable device 12 or as an addition to, include but are not limited to: biometric sensor devices for detecting and measuring an individual's 11 physiological characteristics, e.g., a motion sensor, an accelerometer, a pulse-oximeter to monitor the wearer's heart rate, a breathing rate monitor, a biochemical sensor, a particular hormone level detector, a skin conductance detector, a moisture detector, an infrared light detector, or combinations thereof, or any device that could sense the biometric signals from the user and/or physical gestures and reactions made by the user.

In one embodiment, the wearable device(s) 12, processing device 25 and recording devices 30 may form a local network at the individual. In one embodiment, the local network may be configured as a personal area network (PAN) to provide the intra/inter-connected cognitive sensing, recording and processing functions described herein. Such a network may employ wired or wireless communications technologies. In one embodiment, the network may be a wireless PAN, e.g., based on the standard IEEE 802.15. WPAN may employ wireless technologies such as Bluetooth or Infrared Data Association (IrDA) or Near Field Communications (NFC) technology.

In a further embodiment, the wearable devices 12 including biometric sensors and detectors, and the recording devices, may establish communication with a higher level network 40, e.g., an Internet web-site, that is configured with a processing device(s) 35 to perform or control the intra/inter-connected cognitive sensing, recording and processing functions described herein. In one embodiment, the networked sharing infrastructure 40 may be implemented to receive and process the sensor data signals 15 transmitted from the individual's wearable devices, or vision devices 19, or additionally receive biometric signals or other inputs 45 from other users in close proximity to the individual, e.g., a few meters.

For instance, in one embodiment, the individual's personal network or network 40 may additionally receive biometric signals or other inputs 45 from other users who may be networked with individual 11 when in close proximity to the individual. For example, such other inputs 45 may include a video recording, a cognitive and emotional state, and/or interpreted sensor data of other networked users in the proximity of the individual, e.g., a video recording of their expressions or hand or body gestures, emotional state and related biometric sensor data, that the hardware processing unit 35 may use in real-time when ascertaining a cognitive state of the individual 11.

Further, in one embodiment, the system may be configured to detect a trigger such as a gesture by the individual 11 to initiate a recording. As will be described, the physical gestures and responsive action correlation may be made such as by training the system 10 using a machine supervised learning algorithm so that the system may learn a gesture and correlate it to an action by the system 10 (e.g., start a recording of a live event).

Based on intra- and inter-cognitive sensing functions of the network 40 and processing unit 35, and the real-time processing of biometric signals of the individual and/or other users in response to a live and/or unplanned event, signals 28 may be transmitted to a recording device 30 to initiate the live event recording. For example, the system could detect wirelessly communicated signals 15 from biometric sensors indicating that a heart-rate of the individual and skin moisture level has increased significantly in a short period of time. In response to these received sensed signals 15 from that individual, the processor 25 or 35 may ascertain a state of the individual 11, and responsively trigger the recording device 30 to record an event 75 that is happening in the wearer's locality.

Thus, as shown in FIG. 1, the local processing unit 25 or processing unit 35 that analyzes the simultaneous signals received from various sensors, may responsively issue a set of signals 28 to appropriate devices, e.g., a camera, or smart phone or mobile phone camera 30, to either record the on-going event taking place in the user's locality, or to stop the recording of the on-going event.

Once the event is recorded, it may be stored locally in the recording device or network 40. Subsequent processing using a network cloud, e.g., cloud computing environment 90, and particularly, using an analytics processing device 50, e.g., of a web-based server device (not shown), is provided that can automatically receive the recorded material 80 of the event 75, and includes functionality to feed the recorded event and/or associated data/metadata and/or aspects 85 of the recorded event 75 to one or more social networking web-sites 60a, 60b, etc., to make the recording available for others.

Figure 2:
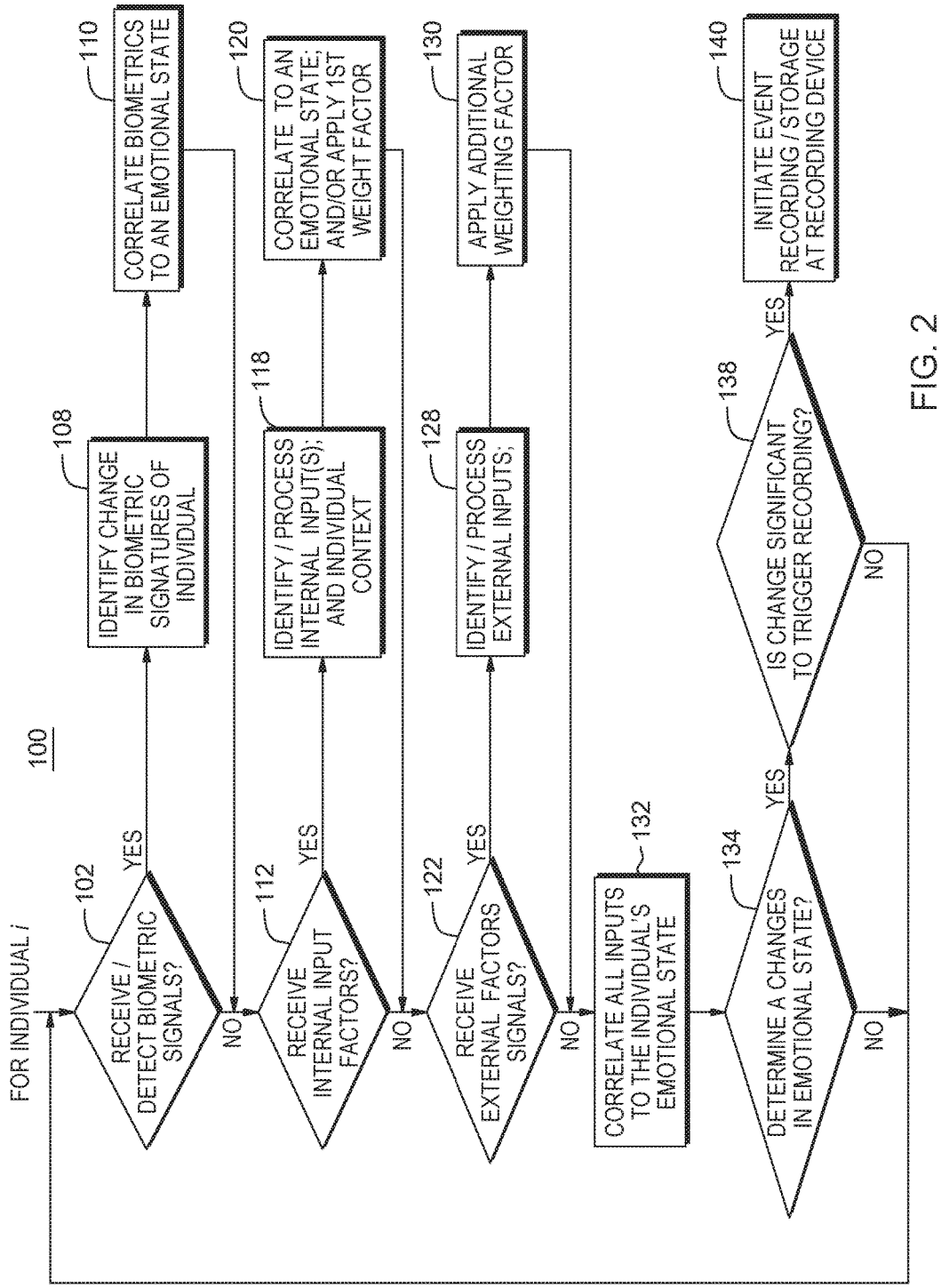
FIG. 2 depicts a methodology 100 implemented by a processing unit that in one embodiment is used to ascertain from received signals an emotional state of an individual for use in triggering a recording.

FIG. 2 shows a methodology 100 implemented by processing unit 25 either locally or in the remote network location 40 that in one embodiment is used to ascertain the processes inputs for an individual. In one embodiment, the processor unit lays idle until it receives inputs at 102 when it determines that signals received are sensor signal data pertaining to the individual's biometrics (e.g., from wearable devices or Google glasses). At 102, if biometric signals are received, the method proceeds to 108 where there is identified a change in the biometric signature of the individual. At 110, the process, having been previously trained as a cognitive system, will correlate the determined biometric signature of the individual to an emotional state of that individual (i.e., what the user "is feeling") and afterward return to step 112. If at 102, no current biometric signals are received at the processing unit, then the method will proceed automatically to determine if any other type of inputs have been received.

That is, at 112 and 122 it contemplated that other signal inputs are received by the network including signals representing other internal factors or external factors. These additional internal factors (at step 112) or external factors (at step 122) are further used in determining said individual's emotional state. Thus, in one embodiment, at 112, a determination is made as to whether any internal input factors have been received. If no internal factors have been received, (e.g., a change in certain hormone levels) then the process will continue to 122, FIG. 2. Otherwise, if signals representing internal factors have been received at 112, then the process continues at 118 where the internal factors input(s) are identified and processed.

In one embodiment, internal factors may include but are not limited to: hormone and biochemical changes of an individual in the time period and context before, during, and after an emotional state; and/or electromagnetic field changes in close proximity to the subject individual and in the time period and context before, during, and after an emotional state.

In this processing, at 118, any additional context information pertaining to the individual that can be used in further assessing that user's emotional state could be used. For example, information pertaining to the individual's locality or environment, a cognitive context of the individual, the individual's environment and/or just about anything that refers to the subject individual's own unique context. This context is collected, calibrated, and additionally refined through training of a model. For example, a determination of an individual's increased heart rate or blood pressure alone may not be enough, a person may just have a high resting rate or easily excitable. Using this context information in combination with inputs helps achieve better correlation to an emotional state. Thus, at 120 the contextual and other internal factors pertaining to an individual context may be used in further correlating to the individual's emotional state. In the process, the internal factor inputs may be weighted in accordance with a ranking or priority scheme.

Afterwards, the method returns to step 122 where a determination is made as to whether any external input factors have been received.

In one embodiment, external factors may include but not limited to: recognized emotional states, biometric inputs, and/or precognition inputs of other individuals in proximity to the subject individual; and/or sound frequency, volume, proximity, and novelty in proximity to the subject individual, and/or visual light intensity, color, and movement in proximity to the subject individual.

If no external factors have been received, then the process will continue to 132, FIG. 2. Otherwise, if signals representing external factors have been received at 122, then the process continues at 128 where the external factors input(s) are identified and processed. In the process, the external factor inputs may be weighted in accordance with a ranking or priority scheme.

For example, in one embodiment, the processing unit 25 or 40 may receive further signals from their recording devices, e.g., video and/or audio information inputs from other sources, received at the network 40. For example, these inputs may include signals representing biometric measurements of the individual wearer, or a signal(s) representing one or more of: a recognized emotional state of, a biometric signature of, and a determined precognition input of one or more other individuals in proximity to the individual.

As a further example, a received sensor output may include a video recording of another individual user's facial expression or physical gestures. That is, in one embodiment, other individuals in proximity to the user may employ wearable devices with sensors and can communicate with the individual's network. Information from others' wearable devices and/or identification of user moods or emotional states of others in proximity to the individual e.g., via wireless network device communications, may be received as inputs. Thus, other wearers' individual sensors in addition to received effective emotional states (getting real-time information from other users who are nearby the individual), and then getting a processed emotional state (of the individual or a neighbor) is used in the emotional state determination.

Other "external" signal inputs may include other inputs, e.g., audio signals associated with an event, a video of a facial expression or a bodily gesture of another person in proximity to the wearer, or an interpreted emotional state of other users nearby the individual (i.e., what neighbors "are feeling"). At step 130, FIG. 2, the contextual and other internal factors pertaining to an individual context may be used in further correlating to the individual's emotional state. In the process, the external factor inputs may additionally be weighted in accordance with a ranking or priority scheme.

Whether external factor signals are processed or not, afterwards, the method returns to step 132 the processing correlates each of the received user inputs (e.g., biometric, internal and external factors) to a user's cognitive or emotional state (e.g., agitated, scared, intrigued). In one embodiment, at 132, FIG. 2, there is performed an identification of user moods or emotions based on the received inputs. For example, if there is received external factor input signal indicating a loud sound, and an individual's biometric signals are raised to a level indicating an emotional state (e.g., scared, intrigued, attentive), this emotional identification is a factor that is weighted heavily for use in determining whether to record or not. For example, wearable device are available that include sensors such as moisture, skin conductance, etc. may detect a change in an individual's skin condition (e.g., a conductance, presence of sweat/moisture). Further signals indicating hormonal changes may be received and coupled with receipt of facial expressions or physical gestures (of other's in proximity to the individual), the system is operable in real time to determine the individual's resultant emotional state.

In an example embodiment, a received biometric signal is more heavily weighted and may be given a top priority in processing as the system automatically responds by instantly correlating a biometric signature to an emotional state of the individual. Generally, receipt of a biometric signal, e.g., indicating a change in the individual's hormone levels, or receipt of an electrical signal or video signal operate on short/faster time scales, as compared to the receipt of an audio signal (for example). Receipt of these types of signals are given a higher processing priority, and thus may be more heavily weighted as a factor in determining the individual's emotional state. Other attributes of the received sensed signals may be used to assign weights. For example, the frequency of the signal (e.g., how often the signal is being received from a sensor), a quality of signal (e.g., noisy or not), an intensity level of signal, and/or a type of signal (e.g., analog or digital) received, may all be used in applying a weighting factor to the emotional state determination at step 132.

Thus, at 132, in one embodiment, besides determining if received or associated with events of a shorter time scale or longer time scale, internal or external factors and their associated information may be weighted more or less, depending upon these attributes of the signals received. For example, a received video signal and its visual content, or sensing events and corresponding inputs at a faster time scale (e.g., a flash of lightning) may be given a greater processing weight, and triggers a faster response processing than if/when a corresponding audio segment (e.g., a received thunder sound) is received/processed. That is, by the time the audio signal is received, a biometric signal change may have already been sensed or detected by querying a sensor, and a/the corresponding visual input may have already been received and processed first and given greater weight in determining the emotional state or responsive action. In the case of an audio signal, it may not be necessary to use its information at all, or it may be given a much lower weight in determining an emotional state.

Thus, according to a time scale, the time of the signal's receipt (or the signal's importance (e.g., biometric)) may dictate the logic employed by the processor; and the logic employed by the processor may assign a weight to these additional external or internal factors (inputs) in determining an emotional state and the received signal attributes.

In one embodiment, a weight may be applied to a received emotional state of another individual(s). For example, if an occurrence of an event or related external factor signals are detected in a particular locality, proximity or direction (e.g., left side) from an individual, then input signals from that side of the user may be given a greater weight in determining the emotional state of the individual (e.g., give greater weight to other individuals' emotional state received from individuals located to the left of the individual).

It is understood that the processor device in this determination of emotional state or mood may implement a trained model, which model learns to correlate/associate individual biometric signatures and the individual's context with an emotional or cognitive state (e.g., scared, intrigued, attentive) and/or apply a weight to the input information for processing.

Then, at 134, FIG. 2, a determination is made as to whether any change has been detected in that individual's emotional state. If after all the received inputs are processed it is determined that there is no change in emotional state, the process will return to step 102, where further biometric, external and/or internal factors may be received. For example, an individual may always be in an agitated state, and the inputs processed may or may not warrant the triggering of the recording of the event if the user's heart rate is detected as increasing or the user is detected as sweating. However, with a determined change in an individual's emotional state at 134, the process proceeds to step 138 where a determination is made as to whether the detected change in an individual's emotional state is significant enough to warrant a triggering of the recording. If the determined change in emotional state is not significant enough to warrant triggering of the recording then the process again will return to step 102, where further biometric, external and/or internal factors may be received/processed. Otherwise, if the determined change in the individual's emotional state is significant enough to warrant triggering of the recording, then the processor device will generate signals for input to the recording device to initiate at 140 the recording and storing of the event data, and or conduct a save of already buffered recorded contents.

With respect to the recording devices, as mentioned, these may include one or more video, audio or still image capture devices in one embodiment. For example, the processing device may be configured to trigger and initiate recording at one or multiple recording devices employed, and store the recording(s). For example, at a sports event, there may be multiple video cameras that may be triggered by actions of the processor to obtain multiple views of a significant event that has changed the emotional state of users.

In one embodiment, the detection of an occurrence of an event or related external factor detected in a particular locality, proximity or direction may also be used to determine a focus area or direction in which the recording device is to record a particular event (e.g., video record the left side of an individual given the emotion states determined at that locality/direction). Further, an auto-zoom and focus feature(s) for recording the event may be inherent to the recording device. For a zoom determination, there may be additional inputs required for the recording device to perform the zoom. For example, in a crowd of a large event at a stadium, emotional states may be received in a focused area or locality and, the processor may make a determination to zoom-in a video recording device(s) for recording an event occurring at the locality where many users having increased emotional state change determinations. Thus, crowd reactions in a focused area may be used as a trigger point for the device to record at a zoomed-in level.

In one embodiment, a recording device notebook or a smartphone, or like device equipped with infrared cameras, may be used to obtain signals/images of an emissivity of an area, and responsively create a thermal map which may be used to trigger an area of focus for the recording device, e.g., a live camera recording device can be used to see in the dark—such as if the night vision goggles are used. In one embodiment, the recording device may lie in an idle state (from being in an active device state), or lie in sleep/dormant state until triggered in which case it is brought to a recording state faster. In the case of a networked device, the recording devices may exist in a state ready to record when prompted manually or automatically with signals.

In one embodiment, when the recording device is on, it may be automatically configured to be continuously in a recording mode, in which embodiment audio or audio/visual content signals may be received by a recording device that is continuously on, and these contents stored (e.g., buffering in a memory storage medium). In such embodiment, the recording device may correspondingly purge the recorded/stored buffered contents (e.g., by automatically deleting the content) unless a signal form the processor device is received to save contents, or the recording is manually controlled to record and save. This recording device may always be on, and when a button on the device is pressed, the device will respond by storing (saving) the prior amount of seconds worth of the recorded contents stored already by a buffer. For example, prior to being turned on or awoken, the device may record and store signals representative of the event data temporarily in a device buffer. Thus, when the recording device is manually operated, e.g., pressed at time $t_0$, or when triggered automatically by a processor or like control device, the recording device responds by initiating and storing the buffered data from the memory storage recorded from a prior amount of time, $t_{0\ minus\ a\ few\ seconds}$. Thus, for example, the device may be of a size sufficient to store prior 10 seconds (for example) amount's worth of buffered recording and may buffer/record automatically a time 10 seconds prior to the system sensing and receiving signals associated with an event at $t_0$; and when triggered by a processor or manually, the device will save the recorded content obtained from the prior time $t_{-10}$. A mobile phone such as a smartphone may be equipped with such recording/buffering technology.

In one embodiment, a locality or direction and an applied weighting (e.g., putting more emphasis of people in a locality or direction) may be used to determine where/when and how to record. As external factor signal inputs (e.g., received audio or video signal) may be weighted more heavily as being applied to associate the event in a particular direction or locality relative to an individual (as may be identified from the received signals of an event), the processor logic employed may generate signals for the recording device to focus and/or zoom a recording in the particular direction or locality from where the sound or event is sensed relative to the individual's location.

For example, a determination may be made at step 140, FIG. 2 as to the origin or locality of the received input signal associated with the event. For example, an external factor input indicating a sound physically originating on one side of an individual, or a sensed signal (gesture) physically coming from another user at one side of an individual (e.g., at a left side) will be given emphasis in and the data signals and may be weighted appropriately in determining a recording device type or location direction (e.g., left side) with which recording of the event is to be obtained (e.g., at the left side of the user). Thus, a weighting factor is applied to the data associated with the input biometric or gesture signal.

In a preferred embodiment, the correlation between biometric signatures to emotional manifestation is unique to the individual. Such uniqueness is determined by training and calibration of a model based on a set of events recreated from memory (e.g., visual imagery, recall from own memory of experience) and on-going training and calibration based on novel events.

Novel events can be automatically identified by the system as emotional profiles not yet correlated between individual and event subject, as well as novel events manually identified by the individual to the system.

Figure 3:
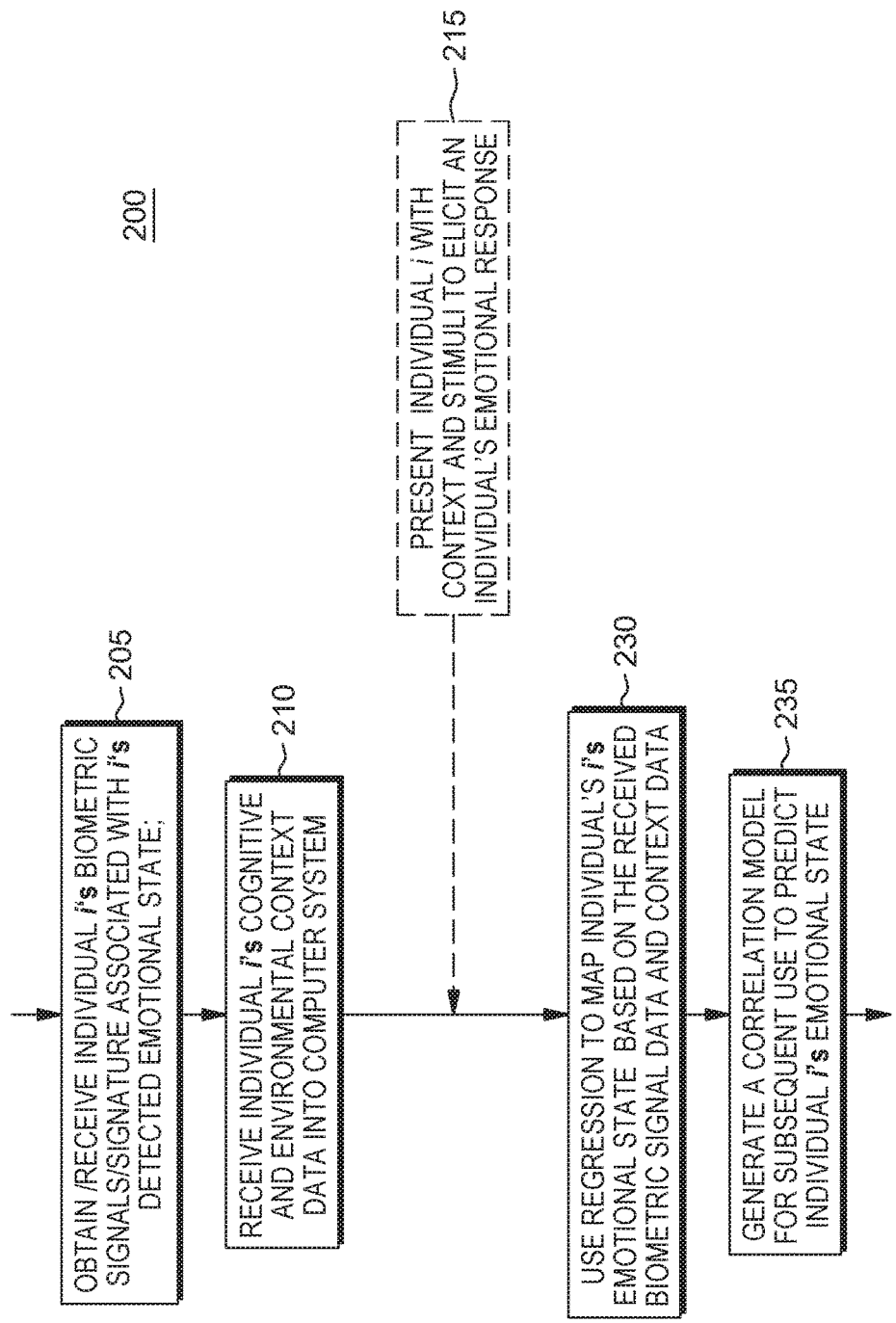
FIG. 3 depicts general operations performed by the system to train a model for use in correlating the individual's biometric signatures and context to that individual's emotional state.

Turning now to FIG. 3, the system is a cognitive system that learns by experience. FIG. 3 depicts operations 200 performed by the system 10 to train a model for use in correlating the individual's biometric signatures and context to that individual's emotional state.

The operations 200 depicted in FIG. 3 includes, at a step 205, receiving and/or obtaining an individual i's biometric signals/signature associated with i's detected emotional state. This may include receipt of an individual i's response to live event stimuli.

Concurrently, or subsequently, the system may receive (or the individual i may provide to the system) that individual's environmental context or cognitive context data for association with the biometric data received. For example, at 210, FIG. 3, the user may input, and the system 10 may further receive individual i's cognitive and/or environmental data information for input into the computer system to the extent it is available.

Alternatively, or in addition, as shown in FIG. 3, in order to create the correlation model, further inputs may be received to train the correlation model. For example, at 215, the individual i may be further provided with simulated context and stimuli in order to elicit individual i's emotional response for use in creating the model. The additional context information may include: a user's profile information or context data associated with that user, data associated with that user's environment, and user cognitive context data.

Based on these inputs: biometric data, and individual environmental or cognitive context inputs, the processor device 25 of the system 10 performs specific method steps to train a emotional state correlation/prediction model. It is understood that the training is not limited to live event stimuli; previously recorded data may be analyzed for significance based on interactive feedback form individual i, (such as but not limited to, live sensory, biometric, or emotional feedback data).

Thus, assuming there is enough data received to train and contribute to the model, the process proceeds to step 230, FIG. 3 in order to implement functions and routines in the processing engine to map the received user biometrics and context data to emotional states and train the model.

For example, the functions and procedures in the program code may implement a regression modeling technique to map user i's biometric data, context data and other user input data (e.g., external and/or internal factor inputs) to one or more baseline emotional states.

In one embodiment, a training algorithm may be employed that implements machine learning (e.g., supervised or semi-supervised) techniques, so that the system becomes a cognitive system. Finally, at 235, the system generates a correlation model for subsequent use to predict individual i's emotional state based on received inputs. Thus, system 10 elements may be used in training the system for subsequent identification and correlation between the sensed biometric and factors and a resulting emotional state.

By training of an individual's personal biometric signals when that person is of a particular emotional state, e.g., curious, interested, scared, agitated, etc., the system 10 learns what sensed signals will trigger the response (and based on the received signals will quickly determine the emotional state and initiate appropriate actions, e.g., record).

Figure 4:
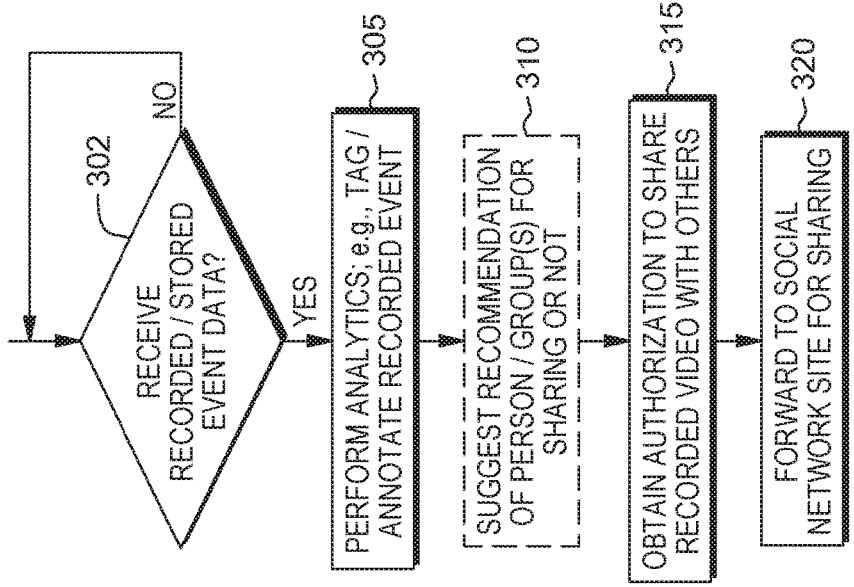
FIG. 4 generally depicts an analytics process used to determine how to annotate a particular recorded event for an individual, and make sharing recommendations of the recorded content.

Turning now to FIG. 4, there is depicted a method for sharing recorded events 300 performed at the analytics processor 50 in the network or cloud network 90. In view of FIG. 1, in operation, while an event is occurring, the wearable sensing and associated transmitting device continuously senses the individual user(s), and obtains information about the immediate locality or surroundings and would process the wired or wireless signals 16, e.g., at a processor device 25 local to the user, or otherwise, transmit a set of signals 15 to a processing device 35 remotely located, e.g., via wireless communications to the network 40, to initiate the recording of the live event 75. As an example, in one embodiment, the system 10 may sense that a car operated by the individual is swerving on a three lane highway, and as the individual user drives, a cognitive live recording of the event is adapted for recording as it is happening. That is, the recording is adaptable to the particular environment as real-time information is being received to trigger recordings.

Once obtained, the recorded event is stored as media data on a local storage media, e.g., associated with the recording device 30, or in a memory storage device on the network 40.

In one embodiment, as shown in FIG. 1, if the device is on a network such as Wi-Fi, a "4G" network, or the like, the recorded event could be uploaded to a secured cloud network 90 employing an analytics processor 50 (e.g., at a server device) by communications the recorded event data using standard TCP/IP protocols and optionally, over a secure communications link, e.g., using a secure sockets layer, or similar communications protocol. The server device may be configured to analyze the video with analytics and tag or annotate key features/personnel as described herein. Thus, a first step 302 is a loop that is idle until the recorded live event data is received by one or more processor devices 50 for analytics processing, which is performed at 305. In an alternate embodiment, the analytics processor employed may be the same processor 25 or 35 used in determining an emotional state and trigger recording.

Thus, in one embodiment, analytics processing at 305 could be performed for characterizing the recorded event as being personal to the individual and/or work-related.

The system analytics processing such as performed at 305, responds to the determined emotional state for triggering the recording, and in one embodiment, may specify additional metadata (e.g., an annotation) for association with the recorded event. Thus, the analytics employed at 305 include a triggering of an annotation or tagging the recording data with additional information for a reader or viewer of the recorded event. A recording of an event may be annotated and the user (individual) and the emotional state may be given as part of the annotation. In an example, cognitive state/emotional states of plural individual students' in a class may be used to annotate the recorded event, and used for example to determine the teacher's class materials or teacher's effectiveness.

In one embodiment, pixel recreation may be used as a post-processing technique to clean up images or video content. Use of interpolation or extrapolation may be used to fix pixels to clear an image prior to being shared or analyzed.

Analytics logic employed at 305 may be programmed to process and learn, e.g., such as by supervised or unsupervised training, to decide who to share the recorded event data with; and, in other embodiments, decide how to annotate the recorded event for the particular viewers to whom the content is shared. The analytics for sharing in the system will operate on the recorded event data received from the recording device, and stored/saved in the buffer. The logic used in determining whether to trigger the recording, i.e., by the emotional state determination, may be used by the analytics, e.g., at 310, FIG. 3, to determine how to share.

Thus, the system analytics may learn to whom the recorded event should be sent to, e.g., predict that the particular type of event would be targeted to a family member, versus a co-worker. The system analytics at 310 may further recommend to the individual certain individual(s) or group of people who may receive a recorded event, or determine that the recorded event and corresponding annotation of a mental state should not be shared at all. This may be correlated to previous individual behavior, e.g., certain contexts/events may be detected/recorded and prior shared with family members may be used to train the system analytics. Thus, the trained system may respond by predicting when a new received recorded event would be suitable for certain family members, and for example, recommend to the individual to share the event with family members.

In one embodiment, the system may consult with the individual prior to sharing, or alternately, the system analytics may automatically receive the recorded content and share the recorded content without user input. Thus, in one embodiment, the user is given the option to review the annotation or metadata of the recording (e.g., based on the determined emotional state). Thus, responsive to the applied analytics and in response to a received recommendation at the individual how the recorded video event may be characterized/annotated, and to which other people the annotated recorded event may be forwarded to for sharing, the method proceeds to step 315 to obtain the individual's acceptance of the recommended annotation or characterization of the recorded event metadata, and/or the provide the authorization to share with the recommended people.

In one embodiment, after receiving the authorization, and based on that characterization, the method at 320 performs either sharing (such as by feeding) the recorded event into either a user's personal social network circle (e.g., Facebook® 60a, Twitter® 60b, Myspace®, Instagram®, Twitter®, Google®, etc.,) or a work circle (e.g., using IBM Connections, etc.), a user selected group, or each of these.

The analytics processing 300 provides an output by the system 10 that includes: a go/no-go sharing determination, and a high-level synopsis, (i.e., annotations) relevant to reasons why this recorded event is of interest, or is being shared, such as by including one or more of: a summary of emotional state, and summary of biometrics and/or other input conditions warranting the sharing.

Figure 5:
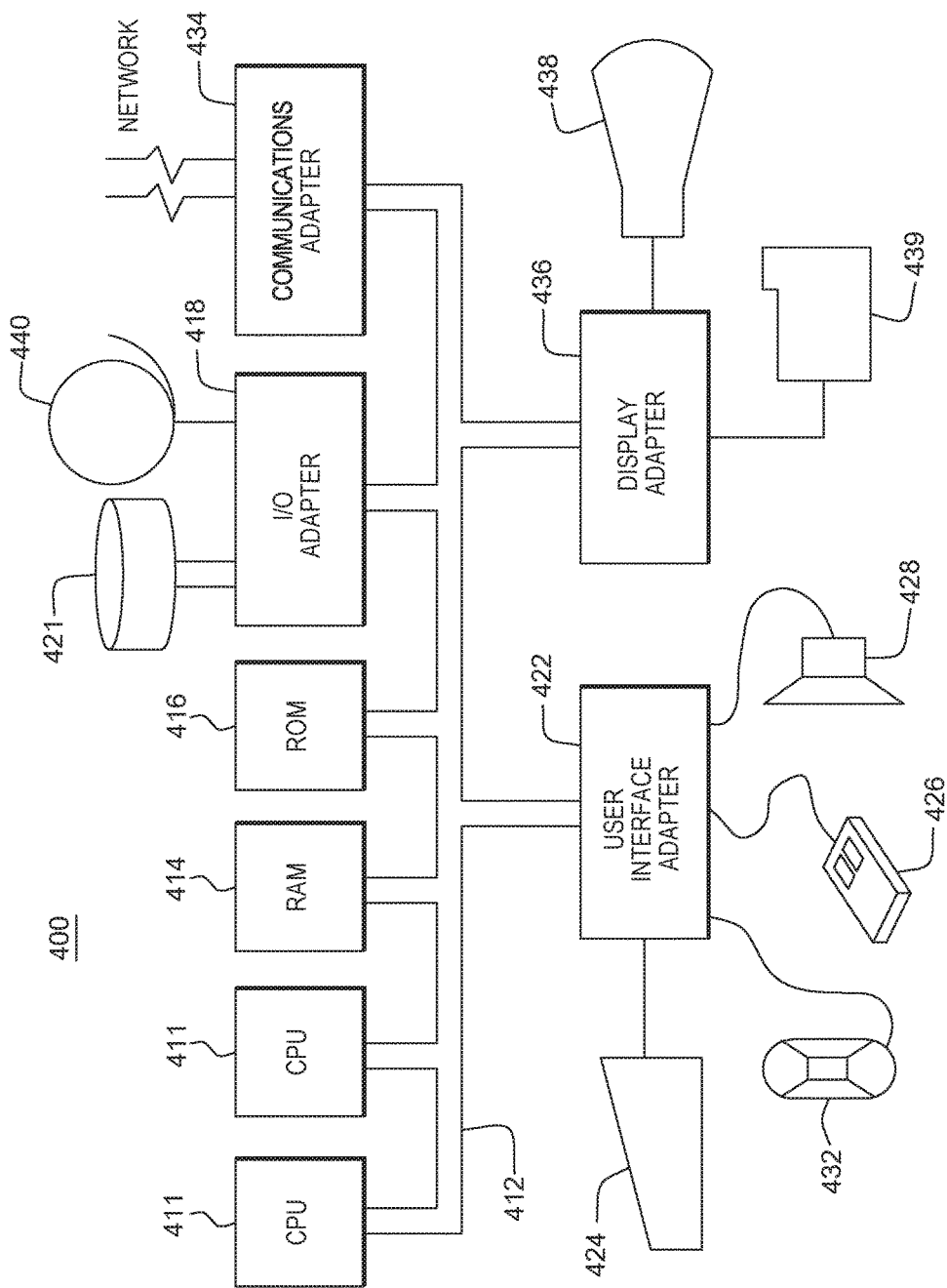
FIG. 5 depicts an exemplary hardware configuration for performing methods such as described in FIGS. 2-4 in one embodiment.

FIG. 5 illustrates one embodiment of an exemplary hardware configuration of a computing system 400 programmed to perform the method steps for implementing a cognitive event determining and sharing service as described herein with respect to FIGS. 2-4. The hardware configuration preferably has at least one processor or central processing unit (CPU) 411. The CPUs 411 are interconnected via a system bus 412 to a random access memory (RAM) 414, read-only memory (ROM) 416, input/output (I/O) adapter 418 (for connecting peripheral devices such as disk units 421 and tape drives 440 to the bus 412), user interface adapter 422 (for connecting a keyboard 424, mouse 426, speaker 428, microphone 432, and/or other user interface device to the bus 412), a communication adapter 434 for connecting the system 400 to a data processing network, the Internet, an Intranet, a local area network (LAN), etc., and a display adapter 436 for connecting the bus 412 to a display device 438 and/or printer 439 (e.g., a digital printer of the like).

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions. These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It is understood that although this disclosure includes a detailed description on cloud environment 90 for analytics computing of the recorded live event for an individual, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 6:
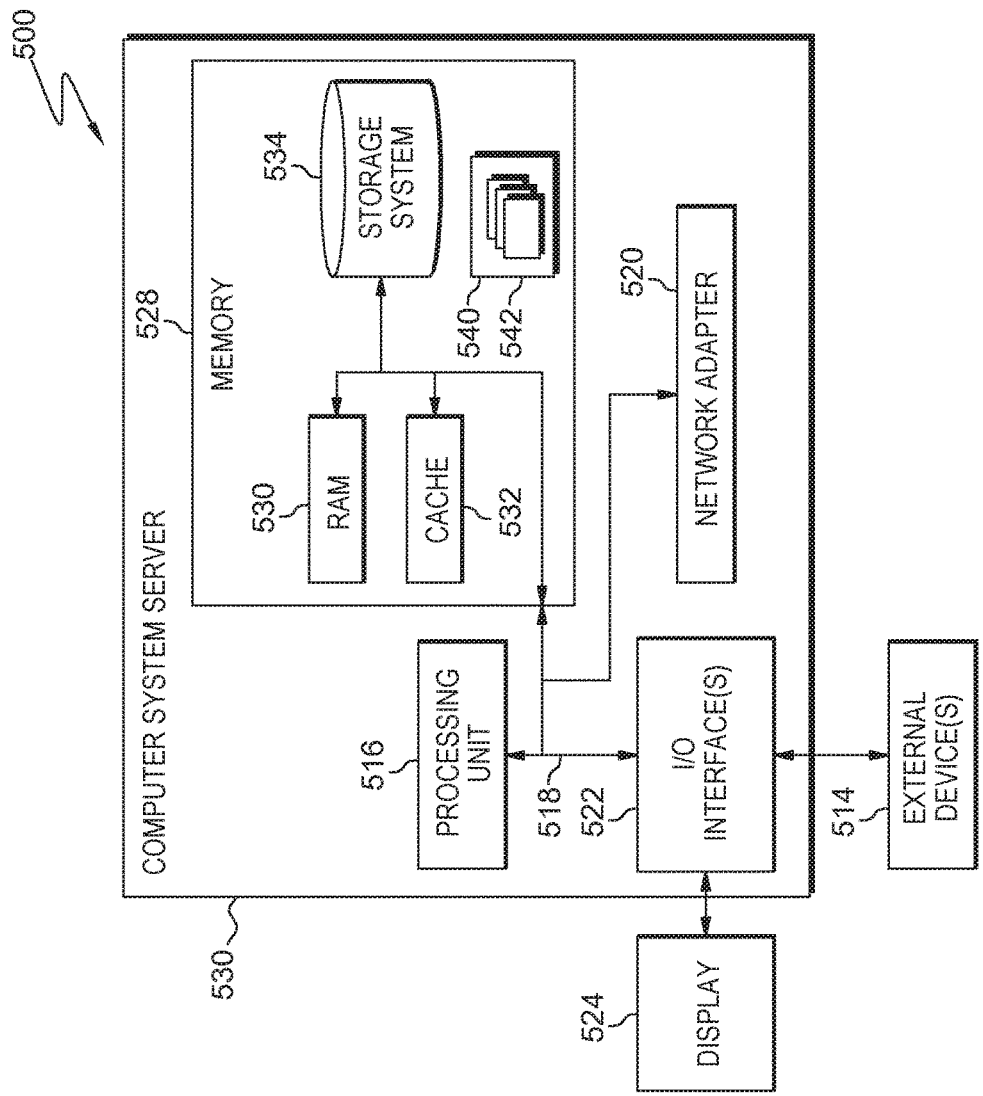
FIG. 6 depicts a cloud computing node according to an embodiment of the present invention.

Referring now to FIG. 6, a schematic of an example of a cloud computing node is shown. Cloud computing node 500 is only one example of a suitable cloud computing node and is not intended to suggest any limitation as to the scope of use or functionality of embodiments of the invention described herein. Regardless, cloud computing node 500 is capable of being implemented and/or performing any of the functionality set forth hereinabove.

In cloud computing node 500 there is a computer system/server 512, which is operational with numerous other general purpose or special purpose computing system environments or configurations. Examples of well-known computing systems, environments, and/or configurations that may be suitable for use with computer system/server 512 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 512 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 512 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 6, computer system/server 512 in cloud computing node 500 is shown in the form of a general-purpose computing device. The components of computer system/server 512 may include, but are not limited to, one or more processors or processing units 516, a system memory 528, and a bus 518 that couples various system components including system memory 528 to processor 516.

Bus 518 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 512 typically includes a variety of computer system readable media. Such media may be any available media that is accessible by computer system/server 512, and it includes both volatile and non-volatile media, removable and non-removable media.

System memory 528 can include computer system readable media in the form of volatile memory, such as random access memory (RAM) 530 and/or cache memory 532. Computer system/server 512 may further include other removable/non-removable, volatile/non-volatile computer system storage media. By way of example only, storage system 534 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 518 by one or more data media interfaces. As will be further depicted and described below, memory 528 may include at least one program product having a set (e.g., at least one) of program modules that are configured to carry out the functions of embodiments of the invention.

Program/utility 540, having a set (at least one) of program modules 542, may be stored in memory 528 by way of example, and not limitation, as well as an operating system, one or more application programs, other program modules, and program data. Each of the operating system, one or more application programs, other program modules, and program data or some combination thereof, may include an implementation of a networking environment. Program modules 542 generally carry out the functions and/or methodologies of embodiments of the invention as described herein.

Computer system/server 512 may also communicate with one or more external devices 514 such as a keyboard, a pointing device, a display 524, etc.; one or more devices that enable a user to interact with computer system/server 512; and/or any devices (e.g., network card, modem, etc.) that enable computer system/server 512 to communicate with one or more other computing devices. Such communication can occur via Input/Output (I/O) interfaces 522. Still yet, computer system/server 512 can communicate with one or more networks such as a local area network (LAN), a general wide area network (WAN), and/or a public network (e.g., the Internet) via network adapter 520. As depicted, network adapter 520 communicates with the other components of computer system/server 512 via bus 518. It should be understood that although not shown, other hardware and/or software components could be used in conjunction with computer system/server 512. Examples, include, but are not limited to: microcode, device drivers, redundant processing units, external disk drive arrays, RAID systems, tape drives, and data archival storage systems, etc.

Figure 7:
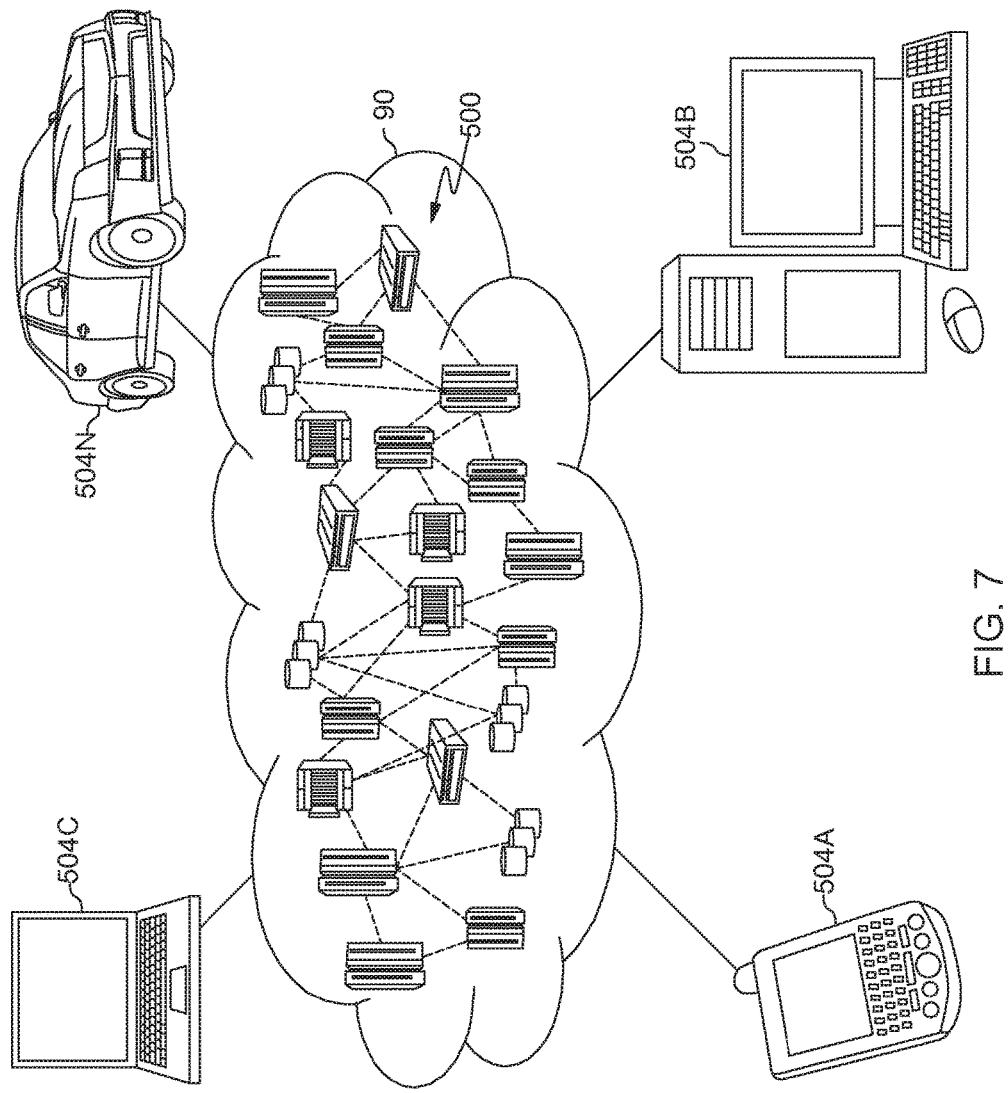
FIG. 7 depicts a cloud computing environment according to an embodiment of the present invention.

Referring now to FIG. 7, illustrative cloud computing environment 90 is depicted. As shown, cloud computing environment 90 comprises one or more cloud computing nodes 500 with which local computing devices used by cloud consumers, such as, for example, personal digital assistant (PDA) or cellular telephone 504A, desktop computer 504B, laptop computer 504C, and/or automobile computer system 504N may communicate. Nodes 500 may communicate with one another. They may be grouped (not shown) physically or virtually, in one or more networks, such as Private, Community, Public, or Hybrid clouds as described hereinabove, or a combination thereof. This allows cloud computing environment 90 to offer infrastructure, platforms and/or software as services for which a cloud consumer does not need to maintain resources on a local computing device. It is understood that the types of computing devices 504A-N shown in FIG. 7 are intended to be illustrative only and that computing nodes 500 and cloud computing environment 90 can communicate with any type of computerized device over any type of network and/or network addressable connection (e.g., using a web browser).

Figure 8:
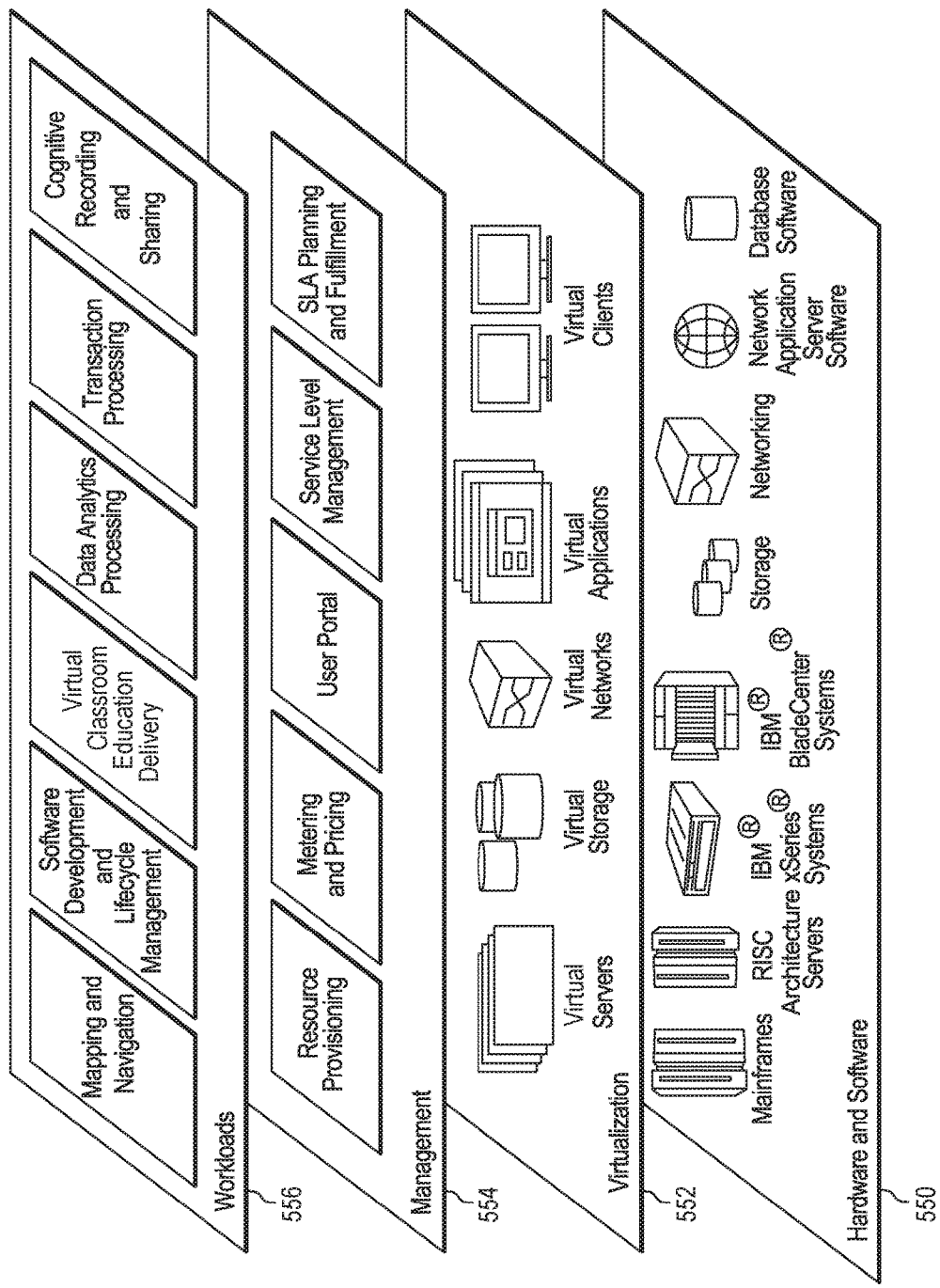
FIG. 8 depicts abstraction model layers according to an embodiment of the present invention.

Referring now to FIG. 8, a set of functional abstraction layers provided by cloud computing environment 90 (FIG. 7) is shown. It should be understood in advance that the components, layers, and functions shown in FIG. 8 are intended to be illustrative only and embodiments of the invention are not limited thereto. As depicted, the following layers and corresponding functions are provided:

Hardware and software layer 550 includes hardware and software components. Examples of hardware components include mainframes, in one example IBM® zSeries® systems; RISC (Reduced Instruction Set Computer) architecture based servers, in one example IBM pSeries® systems; IBM xSeries® systems; IBM BladeCenter® systems; storage devices; networks and networking components. Examples of software components include network application server software, in one example IBM WebSphere® application server software; and database software, in one example IBM DB2® database software. (IBM, zSeries, pSeries, xSeries, BladeCenter, WebSphere, and DB2 are trademarks of International Business Machines Corporation registered in many jurisdictions worldwide).

Virtualization layer 552 provides an abstraction layer from which the following examples of virtual entities may be provided: virtual servers; virtual storage; virtual networks, including virtual private networks; virtual applications and operating systems; and virtual clients.

In one example, management layer 554 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provide pre-arrangement for, and procurement of, cloud computing resources for which a future requirement is anticipated in accordance with an SLA.

Workloads layer 556 provides examples of functionality for which the cloud computing environment may be utilized. Examples of workloads and functions which may be provided from this layer include: mapping and navigation; software development and lifecycle management; virtual classroom education delivery; data analytics processing; transaction processing; and cognitive recording of live events and sharing.

While various embodiments are described herein, it will be appreciated from the specification that various combinations of elements, variations or improvements therein may be made by those skilled in the art, and are within the scope of the invention. In addition, many modifications may be made to adapt a particular situation or material to the teachings of the invention without departing from essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. An apparatus for cognitive recording and sharing of live events comprising:
  a processing unit;
  a recording device to record a live event;
  one or more biometric sensors, each configured for obtaining a biometric signal data from an individual;
  one or more external sensors, each configured for obtaining external signal data from an environment in proximity to the individual, the external signal data comprising data about one or more other individuals in proximity to the individual;
  a transmitting device for communicating the one or more biometric signals and external signal data for receipt at the processing unit, the processing unit configured to:
    obtain a biometric signature of the individual based on a received biometric signal data;
    obtain, based on the external signal data, an external factor representing one or more of: an emotional state of, a biometric signature of, and a determined precognition input of the one or more other individuals in proximity to the individual;

determine the individual's current emotional state based on said obtained biometric signature in combination with said obtained external factor; and record the live event by said recording device in response to said determined emotional state.

2. The apparatus as claimed in claim 1, configured as a networked sharing device including a further processing unit configured to:

receive the recording of said live event, analyze aspects of said recording, and automatically initiate a sharing of said recording via network connection with other individuals based on said analysis.

3. The apparatus as claimed in claim 1, where the processing unit is further configured to:

correlate biometric signals of the individual with a cognitive state or emotional state of said individual.

4. The apparatus as claimed in claim 3, where the processing unit is further configured to:

receive a further input signal representing an internal factor, and use said received internal factor in determining said individual's emotional state.

5. The apparatus as claimed in claim 4, where a received signal representing an internal factor comprises:

a signal representing one or more of: a hormone change and a biochemical change of the individual in a time period before, during, and after determining an emotional state change, a signal representing a detected change in an electromagnetic field in close proximity to the subject individual in the time period and context before, during, and after determining an emotional state change.

6. The apparatus as claimed in claim 1, where the external signal data comprises one or more of:

audible sound, the processor unit further configured to process said received audible signal and determine one or more of: a sound frequency, a volume, and a proximity of the sound source in proximity to the individual; and a signal having light or visual content, the processor unit further configured to process said received visual content and determine one or more of: a visual light intensity, a color, and a movement in proximity to the individual.

7. The apparatus as claimed in claim 6, where said processing unit is further configured to:

apply a weighting to the obtained external factor according to a characteristic of the received audible sound or visual characteristic, said characteristic including a direction or a locality from where a sound or visual content is occurring.

8. The apparatus as claimed in claim 7, wherein said processing unit is further configured to:

apply a weighting to the obtained biometric signature, said weighting being higher than the weighting applied to the obtained external factor.

9. The apparatus as claimed in claim 1, where the processing unit is further configured to:

receive further input signals representing a context of the individual; and use said context of the individual in determining said individual's emotional state.

10. A method for cognitive recording and sharing of live events comprising:

receiving, at a processing device, biometric signal data generated from an individual by one or more biometric sensors and external signal data generated from an environment in proximity to the individual by one or more external sensors, the external signal data comprising data about one or more other individuals in proximity to the individual;

obtaining a biometric signature of the individual based on a received biometric signal data;

obtaining, based on the external signal data, an external factor representing one or more of: an emotional state of, a biometric signature of, and a determined precognition input of the one or more other individuals in proximity to the individual;

determining, at said processing device, an individual's current emotional state based on said obtained biometric signature in combination with said obtained external factor; and triggering a recording device to record a live event responsive to determined emotional state.

11. The method as claimed in claim 10, further comprising:

configuring a processing device to further receive a recording of said live event, analyzing at said processing device, aspects of said recording, and automatically sharing said recording via a network connection with other individuals based on said analysis.

12. The method as claimed in claim 10, further comprising:

correlating received biometric signals of the individual with a cognitive state or emotional state of said individual.

13. The method as claimed in claim 12, further comprising:

receiving, at the processing unit, a further input signal representing an internal factor, and using said received internal factor in determining said individual's emotional state.

14. The method as claimed in claim 13, where a received signal representing an internal factor comprises:

a signal representing one or more of: a hormone change and a biochemical change of the individual in a time period before, during, and after determining an emotional state change, a signal representing a detected change in an electromagnetic field in close proximity to the subject individual in the time period and context before, during, and after determining an emotional state change.

15. The method as claimed in claim 10, where the external signal data comprises one or more of:

audible sound, the processor unit further configured to process said received audible signal and determine one or more of: a sound frequency, a volume, and a proximity of the sound source in proximity to the individual; and a signal having light or visual content, the processor unit further configured to process said received visual content and determine one or more of: a visual light intensity, a color, and a movement in proximity to the individual.

16. The method as claimed in claim 15, further comprising:

applying a weighting to the obtained external factor according to a characteristic of the received audible sound or visual characteristic, said characteristic including a direction or a locality from where a sound or visual content is occurring.

17. The method as claimed in claim 16, further comprising:
applying a weighting to the obtained biometric signature, said weighting being higher than the weighting applied to the obtained external factor.

18. The method as claimed in claim 10, further comprising:
receiving, at the processing unit, a further input signal representing a context of the individual; and
using said context of the individual in determining said individual's emotional state.

19. A computer program product comprising a non-transitory computer readable medium embodying computer program instructions being run by a processor device for causing a computer system to perform method steps for cognitive recording and sharing of live events, said method steps comprising:
receiving biometric signal data generated from an individual by one or more biometric sensors and external signal data generated from an environment in proximity to the individual by one or more external sensors, the external signal data comprising data about one or more other individuals in proximity to the individual;
obtaining a biometric signature of the individual based on a received biometric signal data;
obtaining, based on the external signal data, an external factor representing one or more of: an emotional state of, a biometric signature of, and a determined precognition input of the one or more other individuals in proximity to the individual;
determining, at said processing device, an individual's current emotional state based on said obtained biometric signature in combination with said obtained external factor; and
triggering a recording device to record a live event responsive to determined emotional state.

20. The computer program product as claimed in claim 19, where the external signal data comprises one or more of:
audible sound, the processor unit further configured to process said received audible signal and determine one or more of: a sound frequency, a volume, and a proximity of the sound source in proximity to the individual; and
a signal having light or visual content, the processor unit further configured to process said received visual content and determine one or more of: a visual light intensity, a color, and a movement in proximity to the individual,
wherein said method further comprises:
apply a weighting to the obtained external factor according to a characteristic of the received audible sound or visual characteristic, said characteristic including a direction or a locality from where a sound or visual content is occurring; and
apply a weighting to the obtained biometric signature, said weighting being higher than the weighting applied to the obtained external factor.

* * * * *